US012372016B1

(12) United States Patent
Hanna

(10) Patent No.: US 12,372,016 B1
(45) Date of Patent: Jul. 29, 2025

(54) SELF-CHARGED FOUR STROKE ONE-CYCLE COMBUSTION CYLINDER FOR INTERNAL COMBUSTION ENGINE

(71) Applicant: Ibrahim Hanna, Miami, FL (US)

(72) Inventor: Ibrahim Hanna, Miami, FL (US)

( * ) Notice: Subject to any disclaimer, the term of this patent is extended or adjusted under 35 U.S.C. 154(b) by 0 days.

(21) Appl. No.: 18/644,655

(22) Filed: Apr. 24, 2024

(51) Int. Cl.
| | |
|---|---|
| *F01M 1/16* | (2006.01) |
| *F01M 1/08* | (2006.01) |
| *F02B 25/02* | (2006.01) |
| *F02D 13/02* | (2006.01) |
| *F02F 7/00* | (2006.01) |
| *F02F 11/00* | (2006.01) |
| *F02M 35/10* | (2006.01) |
| *F16J 9/12* | (2006.01) |

(52) U.S. Cl.
CPC ............. *F01M 1/16* (2013.01); *F01M 1/08* (2013.01); *F02B 25/02* (2013.01); *F02D 13/0234* (2013.01); *F02F 7/0087* (2013.01); *F02F 11/00* (2013.01); *F02M 35/10157* (2013.01); *F02M 35/10255* (2013.01); *F16J 9/12* (2013.01)

(58) Field of Classification Search
CPC . F02B 9/16; F02B 75/28; F02B 33/14; F01M 1/08; F01M 1/16
See application file for complete search history.

(56) References Cited

U.S. PATENT DOCUMENTS

| 10,781,770 B2 | 9/2020 | Hanna |
| 11,352,942 B2 | 6/2022 | Hanna |

FOREIGN PATENT DOCUMENTS

| BR | 9007374 A | * | 4/1992 | ............... F01L 11/02 |
| GB | 2361030 A | * | 10/2001 | ............... F02B 33/14 |
| WO | WO-2013050068 A1 | * | 4/2013 | ............... F02B 33/08 |

* cited by examiner

*Primary Examiner* — Ngoc T Nguyen
(74) *Attorney, Agent, or Firm* — Mark Terry

(57) ABSTRACT

A self-charged four stroke one-cycle combustion cylinder for an internal combustion engine includes a cylinder defining an internal space segmented into a pre-compression space and a combustion space, wherein a bore size of said cylinder is greater than that of a crank-shaft piston housed within, an occupying structure situated within the cylinder, acting as a secondary piston and configured to reciprocate in unison with the crank-shaft piston, an oil socket with a first outer sleeve and a second inner sleeve designed to enclose the crank-shaft piston, facilitating reciprocation therein, wherein the oil socket is configured for direct lubrication from an engine oil sump to the cylinder's internal surfaces without contaminating the combustion space and configured for supporting exhaust scavenging, and, an air intake assembly capable of directing air into the pre-compression space during a power stroke, with the air being inductively transferred to the combustion space during a retraction stroke.

14 Claims, 7 Drawing Sheets

SELF-CHARGED FOUR STROKE ONE-CYCLE COMBUSTION CYLINDER FOR INTERNAL COMBUSTION ENGINE

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to the field of internal combustion engine and, more particularly, for four stroke internal combustion engines.

BACKGROUND

In the area of combustion engine technology, various innovations in the design and operation of combustion cylinders have improved efficiency. Traditional engines, operating on the classic four-stroke cycle, have been at the center of efforts to improve power output, reduce emissions, and enhance fuel efficiency. The introduction of the relative motion cylinders marked a significant departure from conventional designs, embodying a novel approach to achieving these goals. Prior patents (U.S. Pat. Nos. 10,781,770, 11,352,942) associated with this relative motion cylinder technology introduced new mechanical concepts such as a pre-compression space for air suction during a power stroke, and the execution of four strokes within a single reciprocation cycle.

The practical realization of the relative motion cylinder concept encountered substantial hurdles. The intricate mechanics of reciprocation, particularly the controlled motion of a structure acting as a second piston, posed significant challenges. This was further complicated by the need for precise control mechanisms capable of optimizing pressure forces, which could potentially include electromagnetic or mechanical controls. Moreover, the integration of a mechanical link between the occupying structure and the crankshaft introduced additional complexities in the design process. For example, the simple design of rods to mechanically connect the occupying structure to crank-shaft piston, caused that occupying structure and crank-shaft piston do not separate when required to do so during a power stroke, according to calculated pressure designs, and special angular design was needed to have mechanical connections of the occupying structure, provide motion stability without a negative impact on what combustion pressure dynamics is supposed to accomplish during a combustion cycle. Lubrication, essential for the smooth operation of any engine, presented another layer of difficulty. For example, when trying to use a cylindrical skirt to protect the combustion space from oil contamination, the attempted designs faced serious historical challenges of high oil consumption, because lubricating a conventional skirt would require that oil reaches the space between the skirt and the internal cylinder surface through a journal passing the engine block, where the oil particles will get trapped and reciprocated along with the skirt at high velocity subjecting the oil particles to high pressures, and causing the non-practical use of a skirt, despite other benefits like a quieter and cooler engine.

Reciprocating a crank-shaft piston within a sleeve is known technology of sleeve valving, with known advantages and disadvantages. At least one large American company conducted extensive research in single sleeve valve engines, pointing out that they were eventually cheaper and easier to produce, and main dissaving is the oil consumption challenge.

During the development and engineering trials of the relative motion engine described above, one engineering suggestion involved positioning exhaust channels between occupying structure and the crank-shaft piston, however, such designs failed mainly due to interfering with lubricating oil.

In another design study, engineers aimed to ensure that mechanical links of the occupying structure complimented the pressure controls of the occupying structure motion. However, a complication arose when straight parallel rods connecting the crank piston and the occupying structure created conflicts between the acting pressure and the limitations imposed by the mechanical links, specifically the crank-shaft connecting rods. To address this challenge, the mechanical link arrangement was modified. Another solution involved using connecting rods that angled with the crank-shaft piston rod, suitable for engine applications requiring variable speeds. Alternatively, for fixed speed applications such as electrical generation engines, other types of mechanical supports were considered, such as supporting springs to facilitate the structure's motion.

In light of the problems with the prior art, there exists a need for more efficient and trustworthy advancements in the field of internal combustion engines, that addresses both environmental and efficiency concerns.

BRIEF SUMMARY

In one embodiment, a self-charged four stroke one-cycle combustion cylinder for an internal combustion engine is disclosed. The internal combustion engine includes a cylinder defining an internal space segmented into a pre-compression space and a combustion space, wherein a bore size of said cylinder is greater than that of a crank-shaft piston housed within, an occupying structure situated within the cylinder, acting as a secondary piston and configured to reciprocate in unison with the crank-shaft piston, an oil socket located adjacent to the occupying structure, the oil socket comprising a first outer sleeve connected to an upper part of the occupying structure and a second inner sleeve connected to a lower part of the occupying structure, wherein the second inner sleeve is designed to enclose the crank-shaft piston, facilitating reciprocation therein, wherein the oil socket is configured for direct lubrication from an engine oil sump to the cylinder's internal surfaces without contaminating the combustion space, and without trapping or subjecting oil particles to higher pressure, and also configured for supporting exhaust scavenging, and, an air intake assembly capable of directing air into the pre-compression space during a power stroke, with the air being inductively transferred to the combustion space during a retraction stroke via the use of one-way valves.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE SEVERAL VIEWS OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

Figure 1:
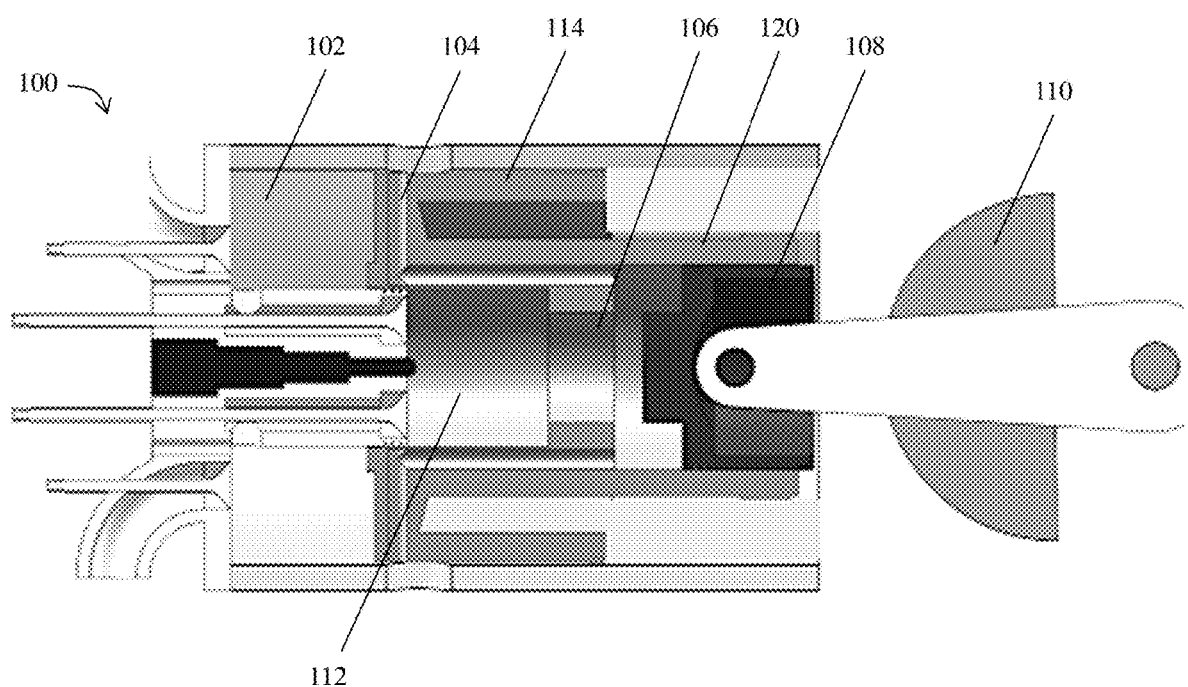
FIG. 1 is a cross sectional side view of the claimed internal combustion engine, in accordance with one embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed apparatus introduces an internal combustion engine that incorporates an innovative oil socket system, effectively overcoming several limitations inherent in the prior art. Traditionally, internal combustion engines have struggled with efficient lubrication management, often leading to oil contamination in the combustion space, which significantly impairs engine performance and longevity. Another lubrication challenge suffered around cylinder sleeves due to oil particles getting trapped and reciprocated with the sleeves, subjecting oil particles to high pressure and causing that oil needed to be changed more frequently. The newly designed oil socket in the claimed apparatus not only prevents such contamination but also simplifies the engine's lubrication system by enabling direct oil flow from the sump to the cylinder's internal surfaces without unnecessary pressure build-up. This results in a more efficient lubrication process, and extends the engine's operational life by reducing wear and tear on critical components.

Another significant challenge addressed by the claimed apparatus is the optimization of air intake and exhaust scavenging. Prior engines often experienced restricted airflow due to the physical limitations of their design, which could stifle engine performance and efficiency. The air intake assembly of the claimed apparatus is specifically engineered to maximize airflow into the pre-compression space during the power stroke and ensure optimal transfer of air to the combustion space during the retraction stroke. This is achieved through the strategic use of one-way valves that not only streamline the airflow but also enhance the overall efficiency of the combustion process.

In one example, if one used a conventional cylinder with 86 mm bore and 78 mm stroke, to operate at 2800 RPM, then such cylinder under natural aspiration can use about 452 cubic centimeter of air suctioned during a two-cycles period of about 46 millisecond, and that means the time available for air intake for each power stroke is about 11 millisecond. In comparison, using 86 mm crankshaft-piston diameter, and 78 mm stroke distance, in the disclosed "relative motion engine," with a bigger bore size of the precompression space measuring 150 mm with a 53 mm precompression span, the cylinder will be able to suck about 786 cubic cm of naturally aspirated air, and the time available to complete such work if similar number of power strokes were needed, would be 23 millisecond rather than 11 millisecond. This design can allow a cylinder-self-air-induction equivalent of 1.73 bars of turbo-charging (786/452=1.73) when compared to a conventional turbocharging. In another comparison, the presence of the occupying structure, will decrease the displacement requirement of the crankshaft piston from 452 cubic cm to 295 cubic cm, which will maintain a higher pumping pressure behind the crankshaft piston during a power stroke, and the air flow dynamics will then compare at 2.66 bars of conventional turbocharging (786/295=2.66). The capability of ridding of conventional turbocharging would mean a lesser heat waste and lesser need to deploy cooling subsystems. Also if turbocharging was to be used as in conventional engines, the air charge levels would be much higher in a "relative motion cylinder," about double. This advantage solved the difficulties faced the prior art of the relative motion engine, where the pre-compression space of 86 mm bore, was capable of suctioning only about 150 cubic centimeter of air, which was less than the conventional engine capability.

Additionally, the design of the oil socket and its integration with the cylinder and occupying structure enhances the structural integrity of the claimed apparatus. This integration facilitates smoother operation and minimizes mechanical complexities, thereby reducing maintenance requirements and improving reliability. The use of advanced materials, such as aluminum for the oil socket and ceramic coatings for the occupying structure, further enhances the engine's performance by improving heat dissipation and resistance to high pressures and temperatures encountered during operation. Also, the use of grey iron for the oil socket in a diesel engine, can contain the combustion forces and offer the opportunity to build a diesel engine block from aluminum rather than iron, which was not something possible in conventional engines.

The overall benefits of the claimed apparatus extend beyond mere technical improvements. By addressing critical issues such as oil leakage, air intake efficiency, and component wear, the engine's operational efficiency is significantly enhanced, leading to better fuel economy, reduced emissions, and lower operational costs. These improvements make the claimed apparatus highly suitable for modern automotive applications where environmental regulations and economic considerations demand high-performance, low-emission engines. The inventive features detailed herein thus not only solve the problems faced by previous designs but also offer a significant advancement in the technology of internal combustion engines.

Referring now to the drawing figures in which like reference designators refer to like elements, the claimed device will now be described with reference to FIGS. 1-7.

FIG. 1 is a cross sectional side view of the claimed internal combustion engine 100, in accordance with one embodiment. FIG. 1 illustrates the pre-compression space 102 and the combustion space 112, both integral to the engine's operational cycle. The occupying structure 106, centrally positioned within the cylinder, acts to segregate these two spaces and serves as a dynamic barrier that moves in sync with the crank piston 108. The crank piston 108, attached to the crank shaft 110, is shown encased by the inner sleeve 120 of the oil socket, which facilitates its reciprocation. The outer sleeve 114 of the oil socket is also visible, providing structural support and aiding in lubrication management by preventing oil contamination of the combustion space 112. The exhaust channel 104 is strategically located within the internal combustion engine 100, extending from the combustion space 112 to the distal end 124, where it facilitates the expulsion of exhaust gases from the engine. The exhaust channel 104 functions by channeling the gases produced during combustion out of the engine, thereby ensuring efficient clearance of the combustion space for the next cycle, improving the engine's overall performance and reducing emissions.

Figure 2:
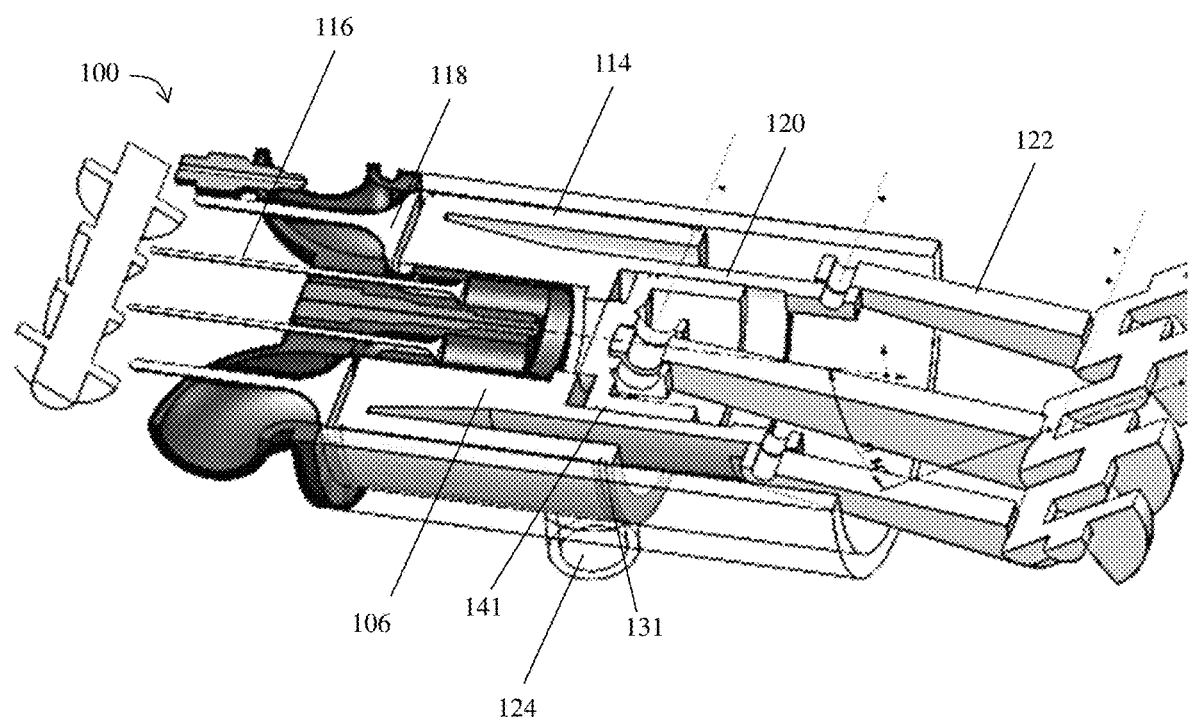
FIG. 2 is a perspective cross sectional side view of the claimed internal combustion engine, in accordance with one embodiment.

FIG. 2 is a perspective cross sectional side view of the claimed internal combustion engine 100, in accordance with one embodiment. FIG. 2 shows a more detailed look at the arrangement of the puppet connection valve 116 and the puppet intake valve 118. These valves control air flow into and out of the pre-compression space 102 and the combustion space 112, optimizing the engine's breathing capabilities. The crank shaft 110 and crank shaft rod 126 are depicted, illustrating how motion is transferred from the crank shaft to the crank piston 108, which is crucial for the reciprocating movement of the engine components. The oil socket outer sleeve 114 is part of the oil socket assembly adjacent to the occupying structure 106, encompassing the inner sleeve 120 to form a protective barrier that prevents oil from contaminating the combustion space 112. It functions by maintaining a clean separation between the lubrication system and the combustion processes.

Located within the oil socket outer sleeve 114, the oil socket inner sleeve 120 encases the crankshaft piston 108, facilitating its smooth reciprocation within the engine 100. The oil socket inner sleeve 120 aids in the direct lubrication of the crankshaft piston, enhancing the engine's efficiency and reducing wear, by minimizing friction losses during a power stroke, as for example, when the power stroke is 78 mm and the precompression span is 53 mm, then the friction distance between the crankshaft piston and the inner sleeve is only 50 mm during the entire power cycle, which compares to 312 mm of friction distance in a conventional four stroke cylinder, and when friction losses account for about 20% of operating powers, especially at higher operating speeds, such loss can decrease to less than 4% in the relative motion cylinder. The oil socket rod 122 is integrated within the oil socket assembly, connecting the inner and outer sleeves (120 and 114) to the engine's structure. The oil socket rod 122 stabilizes the oil socket, ensuring it remains properly aligned and functions effectively to distribute lubrication oil without leakage. Positioned at the furthest point of the exhaust channel 104 within the internal combustion engine 100, the distal end 124 serves as the exit point for exhaust gases, efficiently channeling them out of the engine to reduce back pressure and enhance the engine's emission performance.

Figure 3:
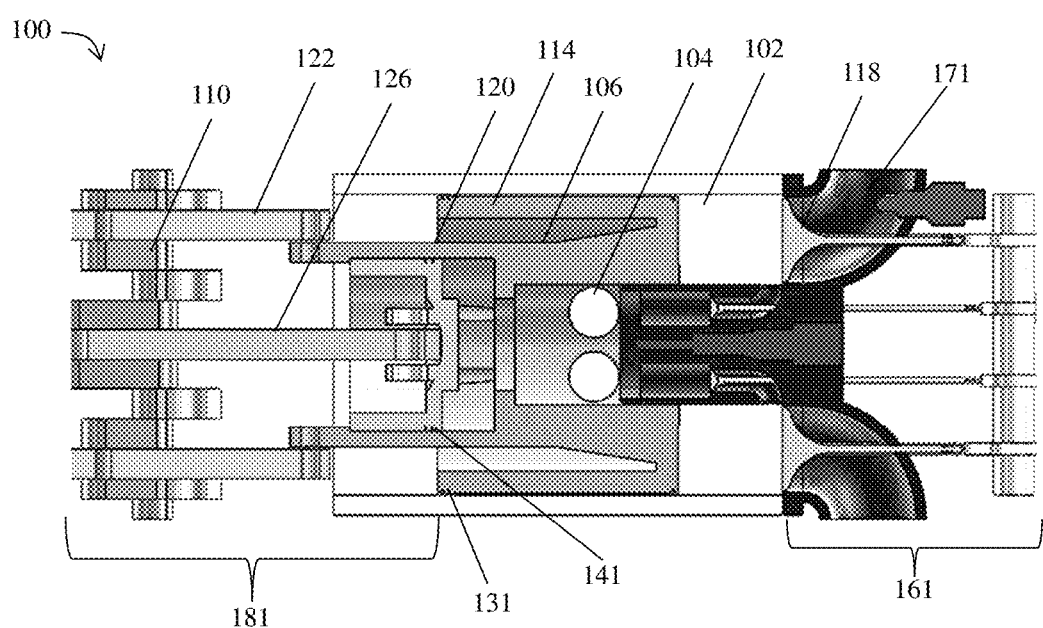
FIG. 3 is a cross sectional side view of the claimed internal combustion engine in a retracted position, in accordance with one embodiment.

FIG. 3 is a cross sectional side view of the claimed internal combustion engine 100 in a retracted position, in accordance with one embodiment. FIG. 3 shows the relative positions of the crank piston 108 and the occupying structure 106 during the retraction phase of the engine cycle. The pre-compression space 102 is at its maximum volume, ready to receive air through the puppet intake valve 118. The crank shaft rod 126 is at its furthest extent from the crank shaft 110, demonstrating the full retraction of the piston.

Figure 4:
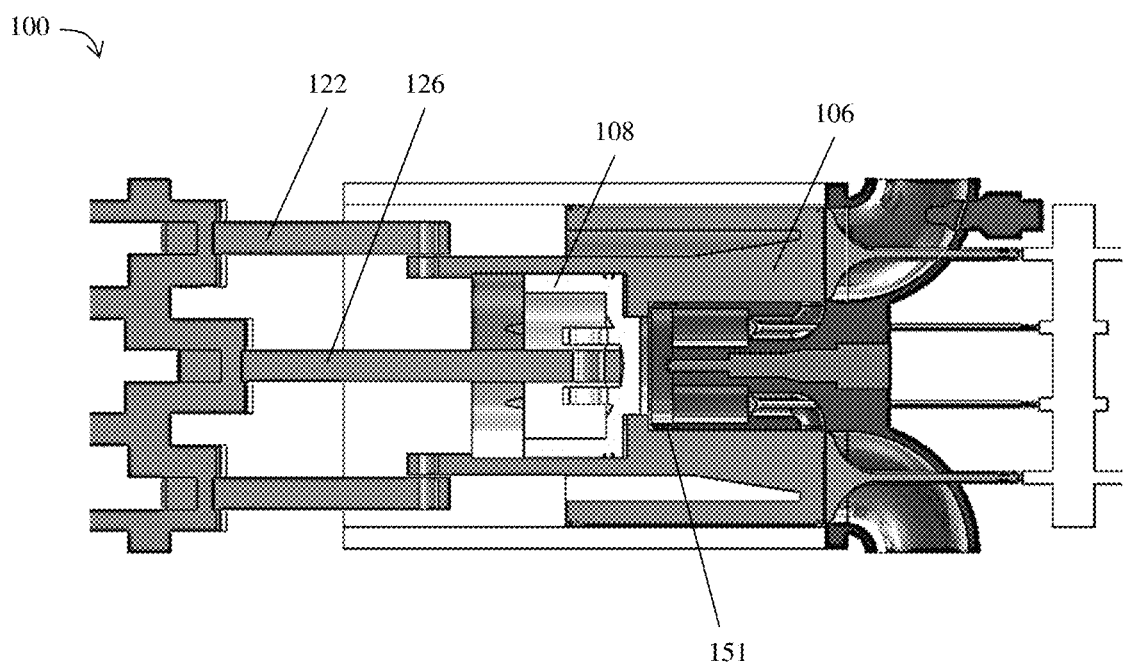
FIG. 4 is a cross sectional side view of the claimed internal combustion engine in an extended position, in accordance with one embodiment.

FIG. 4 is a cross sectional side view of the claimed internal combustion engine 100 in an extended position, in accordance with one embodiment. The phase of FIG. 4 shows the compression of air in the pre-compression space 102, as the occupying structure 106 and crank piston 108 move toward each other, decreasing the space's volume. The puppet connection valve 116 is shown closed, trapping air in the combustion space 112 for the combustion process. The distal end 124 of the exhaust channel 104 is also visible, where exhaust gases will exit the engine.

Figure 5:
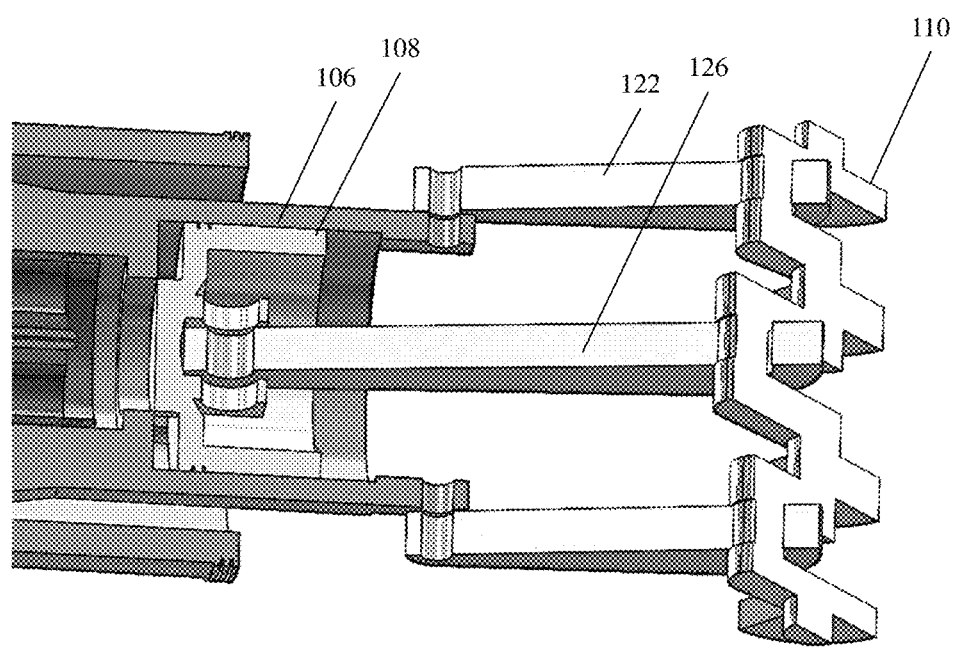
FIG. 5 is a close up of a perspective cross sectional side view of a section of the claimed internal combustion engine, in accordance with one embodiment.

FIG. 5 is a close up of a perspective cross sectional side view of a section of the claimed internal combustion engine 100, in accordance with one embodiment. FIG. 5 shows the interaction between the oil socket rod 122, the crank shaft rod 126, the crank shaft 110, and the mechanical components of the occupying structure 106 and the crank piston 108. The oil socket rod 122 is an integral component of the oil socket assembly, providing structural support and aiding in the precise positioning of the oil socket around the crank piston 108. The oil socket rod 122 ensures the stability and alignment of the oil socket, which is critical for maintaining the oil flow directly to the moving parts without leakage into the combustion space. Directly related in function and position, the crank shaft rod 126 is attached to the crank shaft 110, forming the primary linkage that transmits rotational force from the engine's output to the crank piston 108. This force transfer is essential for converting the linear motion of the pistons into rotational motion, which is then utilized to power the vehicle. The crank shaft 110, positioned centrally within the engine, serves as the backbone for transmitting mechanical power. The crank shaft 110 coordinates the movements of the crank piston 108 and the occupying structure 106, ensuring synchronized motion within the cylinder. This synchronization is crucial for the effective compression and expansion cycles within the engine. The length and angle of the oil socket rod 122, is decided based on pressure designs study to minimize negative interferences between the mechanical motion and the pressure changes during a power stroke. By design, if we remove the oil socket rod, then the oil socket will still reciprocate in the same direction with the crankshaft piston, however it will suffer a shaking motion toward the end of the power stroke before changing direction, and installing the oil socket rod will stabilize the motion of the oil socket motion.

Both the occupying structure 106 and the crank piston 108 are shown in close proximity within the cylinder, illustrating their collaborative function in compressing and expanding the combustion and pre-compression spaces. The occupying structure 106 acts as a secondary piston, moving in tandem with the crank piston 108 to optimize the engine's internal volume and pressure changes during operation, enhancing the efficiency of air and fuel mixture intake, compression, combustion, and exhaust expulsion.

Figure 6:
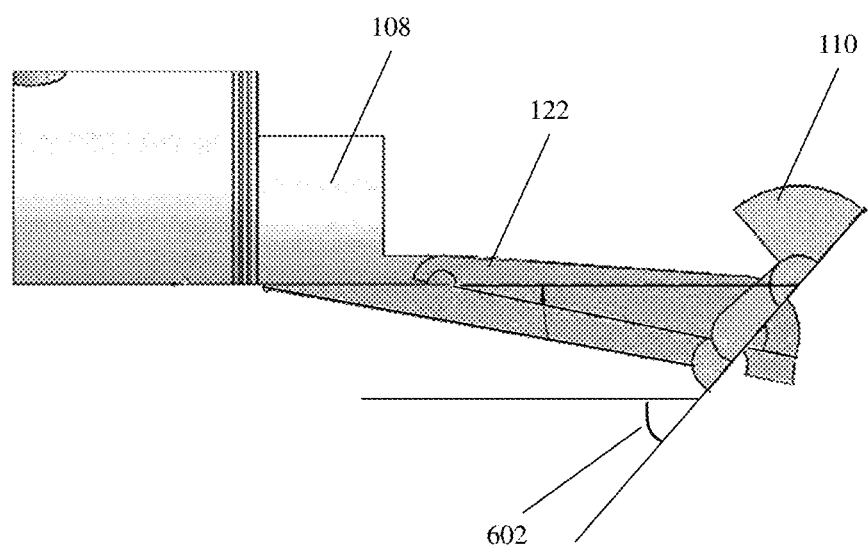
FIG. 6 is a diagrammatic side view of a section of the claimed internal combustion engine, in accordance with one embodiment.

FIG. 6 is a diagrammatic side view of a section of the claimed internal combustion engine 100, in accordance with one embodiment. FIG. 6 shows the interaction between the oil socket rod 122, the crank shaft rod 126, the crank shaft 110, and the mechanical components of the occupying structure 106 and the crank piston 108. Oil socket rods 122 make an angle with crank shaft rod 126 (in this example 5 degrees), wherein the angle will cause an early separation of pistons around 30 degrees (602) of the 360-degree cycle.

Figure 7:
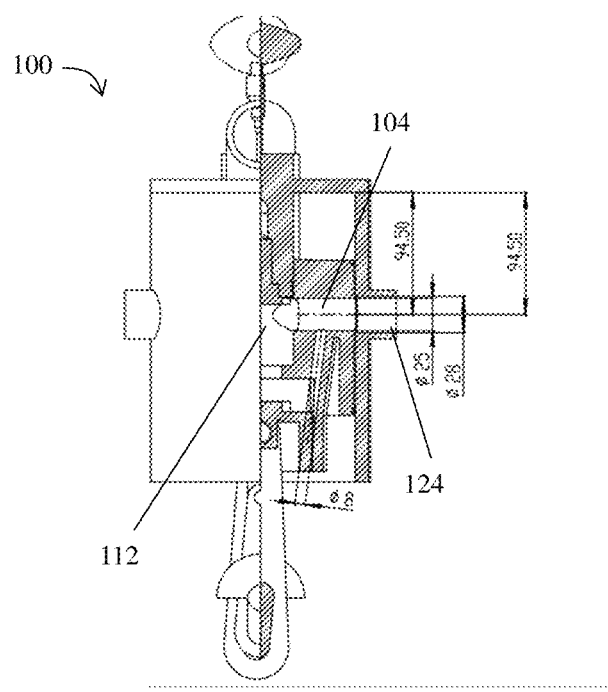
FIG. 7 is a diagrammatic cross sectional side view of a section of the claimed internal combustion engine, in accordance with one embodiment.

FIG. 7 is a diagrammatic cross sectional side view of a section of the claimed internal combustion engine 100, in accordance with one embodiment. FIG. 7 details the exhaust channel 104 and its distal end 124. This figure illustrates how exhaust gases are directed out of the combustion space 112 and through the engine, highlighting the role of the exhaust channel in maintaining efficient engine function.

In one embodiment, the internal combustion engine 100 is designed with a cylinder that defines an internal space, segmented into a pre-compression space 102 and a combustion space 112. The bore size of this cylinder is notably larger than that of the crank-shaft piston housed within, allowing for more effective air and fuel management within the engine. Central to the functionality of this engine is an occupying structure 106, positioned within the cylinder and acting as a secondary piston. This structure is configured to reciprocate in unison with the crank-shaft piston 108, enhancing the engine's efficiency and dynamic response. Adjacent to the occupying structure is an oil socket, which includes a first outer sleeve 114 attached to the upper part of the occupying structure and a second inner sleeve 120 connected to its lower part. The second inner sleeve is configured to enclose the crank-shaft piston, thus facilitating smooth and uninterrupted reciprocation. This oil socket is configured to enable direct lubrication from the engine oil sump to the cylinder's internal surfaces. The oil socket ensures that the lubrication process does not contaminate the combustion space, thereby maintaining the integrity of the combustion process and supporting effective exhaust scavenging.

Furthermore, the engine 100 features an air intake assembly that is adept at directing air into the pre-compression space during a power stroke. This assembly ensures that air is inductively transferred to the combustion space during a retraction stroke through the use of one-way valves, optimizing the air flow and enhancing the overall efficiency of the engine.

The first outer sleeve of the oil socket, denoted as element 114, includes an oil sealing ring 131 strategically positioned at the interface with the cylinder. This design does not allow the oil particles to trap or reciprocate with the pistons nor with the sleeves, and that is to solve the challenge of higher oil consumption suffered whenever sleeves were used Additionally, the second inner sleeve of the oil socket, referred to as element 120, is equipped with an oil sealing ring 141 at its interface with the crank-shaft piston. This feature enhances the lubrication efficiency and minimizes oil leakage, contributing to a cleaner and more reliable engine operation. Further, a turbocharging mechanism 171 is located within the air intake assembly 161. This mechanism facilitates the induction of air into the pre-compression space, effectively increasing the air density and thereby the power output of the engine. To simplify the assembly process and enhance the structural integrity of the engine, the oil socket and the occupying structure, identified as elements 114 and 106 respectively, are integrated as a single machined body. This integration streamlines manufacturing and improves the overall robustness of the engine structure. Moreover, the material chosen for the oil socket is specifically selected to enhance heat dissipation, which helps in maintaining optimal operating temperatures and improving the engine's longevity and performance.

The occupying structure 106 within the engine may be coated with a durable ceramic layer, which allows it to withstand the high combustion pressures and temperatures encountered during engine operation. This coating ensures that the integrity of the structure is maintained even under the stress of high-performance cycles. Moreover, the air intake assembly of the engine may be configured to adjust the timing of valve openings. This functionality controls the volume of air transferred to the combustion space, allowing for variable compression ratios that can be tailored to different fuel types and operating conditions. Such adaptability enhances engine efficiency and performance across a broad spectrum of applications.

Additionally, the engine 100 may include a sophisticated mechanism 181 that adjusts the volume of the pre-compression space 102. This adjustment capability allows for dynamic changes in the engine's compression ratio, thereby enabling the engine to operate efficiently under a range of different conditions, optimizing performance and fuel efficiency. In terms of exhaust management, exhaust scavenging channels may be integrated into both the oil socket and the occupying structure. Sizing these channels follows known standards of design and exhaust recycling requirements. This integration facilitates the efficient removal of exhaust gases from the combustion space, enhancing the engine's emission performance and ensuring cleaner operation. Lastly, the configuration of the crankshaft rod connected to the inner sleeve 120 and the crankshaft rod connected to the first piston may be optimized by arranging them to form a specific angle. This strategic angular arrangement maximizes the transfer of combustion forces to mechanical movement, improving the conversion of energy and enhancing the overall mechanical efficiency of the engine, it also provides a better control over ignition timing, for example if a knock happens in an 86 mm bore conventional cylinder, when compression ratio reaches 14:1 then such knock can be calculated where the crankshaft rods still needs over 30 degrees to complete its 360 degrees of the shaft cycle, and that will direct the knock forces to act in opposite direction and destroy the engine parts, while in the relative motion cylinder, having a bigger cylinder bore, a comparable compression pressure can be 14:1 when the oil socket rod is only 5 degrees short of completing the 360 reciprocation cycle and the crankshaft piston rod already completed the cycle, and that can cause a small power loss, but not parts destruction.

The air intake assembly of the engine 100 may include sleeve valving for air induction, which is configured to control airflow into the pre-compression space and subsequently into the combustion space. This control mechanism ensures optimal air management throughout the engine cycle, enhancing combustion efficiency and engine power output, by partially or completely eliminating the need for a camshaft. Additionally, the engine 100 may, optionally, include a contraction ring 151 positioned against the internal surface of the occupying structure 106. This ring enhances the sealing capabilities of the assembly, effectively reducing oil leakage into the combustion space, thereby maintaining the purity and efficiency of the combustion process. The occupying structure itself may be made from gray cast iron, which is known for its self-lubricating properties due to the embedded carbon particles. Moreover, the oil socket of the engine may be configured to facilitate the use of oil jets for targeted lubrication of the crank-shaft piston 108. This feature ensures lubrication where it is most needed, enhancing the smooth operation of the piston and extending the life of the engine components by reducing wear. Also, the engine block itself may be constructed from aluminum, a material chosen for its lightweight and excellent heat dissipation properties. The use of aluminum helps in reducing the overall weight of the engine, which can contribute to improved fuel efficiency and vehicle performance, while also enhancing heat management within the engine to prevent overheating. Each of these elements contributes significantly to the overall performance, durability, and efficiency of the internal combustion engine 100, making it more suitable for modern applications where reliability and efficiency are paramount.

While certain embodiments have been described, other embodiments may exist. Furthermore, although embodiments herein have been described as being associated with food-like substances, the claimed embodiments may be used with substances used in other fields such as industrial, manufacturing, automotive, marine, medical or the like. Further, the disclosed components may be modified in any manner, including by reordering components and/or inserting or deleting components, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An internal combustion engine comprising:
   a cylinder defining an internal space segmented into a pre-compression space and a combustion space, wherein a bore size of said cylinder is greater than that of a crank-shaft piston housed within;
   an occupying structure situated within the cylinder, acting as a secondary piston and configured to reciprocate in unison with the crank-shaft piston;
   an oil socket located adjacent to the occupying structure, the oil socket comprising a first outer sleeve connected to an upper part of the occupying structure and a second inner sleeve connected to a lower part of the occupying structure, wherein the second inner sleeve is designed to enclose the crank-shaft piston, facilitating reciprocation therein;
   wherein the oil socket is configured for direct lubrication from an engine oil sump to the cylinder's internal surfaces without contaminating the combustion space and configured for supporting exhaust scavenging; and
   an air intake assembly capable of directing air into the pre-compression space during a power stroke, with the air being inductively transferred to the combustion space during a retraction stroke via the use of one-way valves.

2. The internal combustion engine of claim 1, wherein the first outer sleeve of the oil socket further comprises an oil sealing ring at an interface with the cylinder to prevent lubrication oil from being trapped or subjected to a high reciprocation pressure.

3. The internal combustion engine of claim 1, wherein the second inner sleeve of the oil socket includes an oil sealing ring at an interface with the crank-shaft piston to enhance lubrication efficiency and minimize oil leakage.

4. The internal combustion engine of claim 1, wherein the oil socket and the occupying structure are integrated as a single machined body to simplify assembly and improve structural integrity.

5. The internal combustion engine of claim 1, wherein the oil socket is composed of a material that enhances heat dissipation.

6. The internal combustion engine of claim 1, wherein the occupying structure is coated with a ceramic layer that withstands combustion pressures and temperatures.

7. The internal combustion engine of claim 1, wherein the air intake assembly is configured to adjust the timing of valve openings to control the volume of air transferred to the combustion space, enabling variable compression ratios suitable for different fuel types and operating conditions.

8. The internal combustion engine of claim 1, wherein exhaust scavenging channels are integrated into the oil socket and the occupying structure, facilitating efficient removal of exhaust gases from the combustion space.

9. The internal combustion engine of claim 1, wherein the crankshaft rod connected to the inner sleeve and the crankshaft rod connected to the first piston are arranged to form an angle that optimizes transfer of combustion forces to mechanical movement.

10. The internal combustion engine of claim 1, wherein the air intake assembly comprises sleeve valving for air induction, wherein said sleeve valving is configured for control over air flow into the pre-compression space and subsequently into the combustion space.

11. The internal combustion engine of claim 1, further comprising a contraction ring against an internal surface of the occupying structure to provide additional sealing and reduce the oil leakage into the combustion space.

12. The internal combustion engine of claim 1, wherein the occupying structure is composed of gray cast iron exhibiting self-lubricating properties due to embedded carbon particles.

13. The internal combustion engine of claim 1, wherein the oil socket is configured for facilitating the use of oil jets for targeted lubrication of the crank-shaft piston.

14. The internal combustion engine of claim 1, wherein the engine block is composed of aluminum.

* * * * *